Feb. 4, 1947.      P. BROWN      2,415,334
MARKET BASKET
Filed May 2, 1945

Inventor
Paul Brown

By *Clarence A. O'Brien and Harvey B. Jacobson*
Attorneys

Patented Feb. 4, 1947

2,415,334

UNITED STATES PATENT OFFICE 2,415,334

MARKET BASKET

Paul Brown, Chicago, Ill.

Application May 2, 1945, Serial No. 591,494

1 Claim. (Cl. 280—51)

The present invention relates to new and useful improvements in market baskets and more particularly to a hand truck having a basket or receptacle formed as a part thereof.

An important object of the present invention is to provide a hand truck and basket including an upstanding handle at the rear of the truck and having its lower end bent horizontally in a forward direction for attaching to an axle, the forwardly projecting portion of the handle providing a frame for supporting a basket thereon and the front end of the frame being bent downwardly to provide a prop to support the frame and the bottom of the basket in a horizontal position when the device is not in use.

A further object of the invention is to provide an article of this character of simple and practical construction, which is neat and attractive in appearance, strong and durable, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
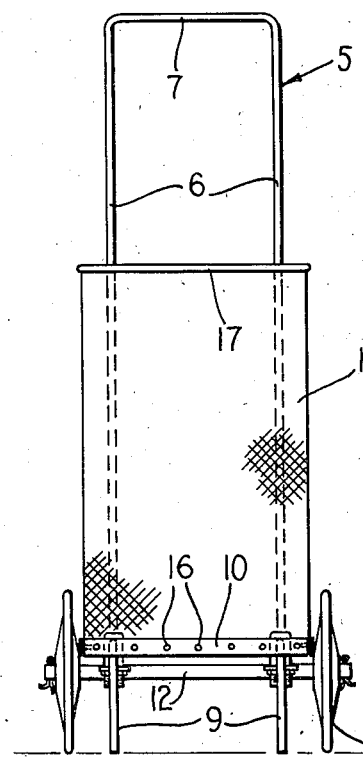
Figure 1 is a front elevational view.

Referring now to the drawing in detail wherein for the purpose of illustration I have disclosed a preferred embodiment of the invention, the numeral 5 designates a handle of generally U-shaped construction and preferably formed of a metal rod, the handle embodying a pair of legs 6 connected at their upper ends by a horizontal hand gripping bar 7.

The lower ends of the legs 6 are bent forwardly to provide a pair of spaced parallel frames 8 and the front ends of the frames are bent downwardly to form a pair of props 9.

A rigid platform or board 10 is secured to the frame 8 by means of U-bolts 11 and the U-bolts also serve to secure an axle 12 in position transversely to the underside of the frame adjacent the junction thereof with the legs 6. Wheels 13 are journaled at the ends of the axle.

The platform or board 10 forms the bottom of a basket 14 preferably constructed of wire mesh material which is secured at its lower edge to the edges of the board or platform 10 by means of a bendable strip of material 15 and nails or other fastening devices 16.

The upper edge of the basket 14 is provided with a reinforcing beading 17 secured to the legs 6 of the handle in any suitable manner.

Figure 2:
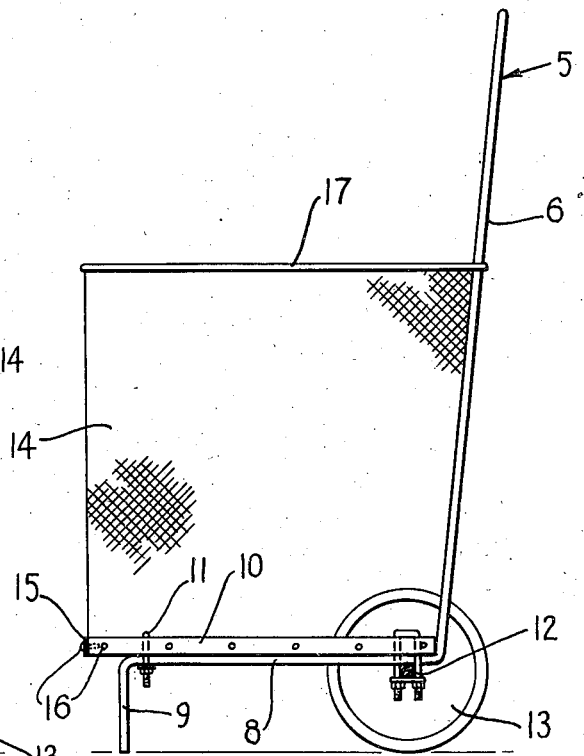
Figure 2 is a side elevational view.

As shown to advantage in Figure 2 of the drawing, the props 9 serve to support the front end of the basket in a horizontal position when the basket is not being pushed over the surface of the ground and when it is desired to move the basket from place to place the handle 5 is tilted rearwardly whereby to lift the props 9 above the ground and the basket may then be balanced on the wheels 13 for convenient pushing over the ground.

Figure 3:
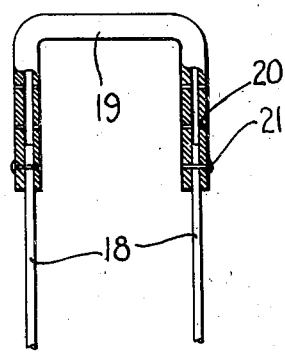
Figure 3 is a fragmentary view in elevation of a modified handle construction.

In Figure 3 of the drawing I have illustrated a modified handle construction in which the upper ends of the legs 18 are connected by an extensible U-shaped handle 19 having its ends telescoping over the legs 18 and provided with longitudinally spaced openings 20 for selectively receiving pins 21 carried at the upper portion of the legs to secure the ends of the handle in longitudinally adjusted position on the legs whereby to provide a vertical adjustment for the handle portion 19.

In view of the foregoing description taken in conjunction with the accompanying drawing it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having thus described the invention, what I claim is:

A basket of the class described comprising a U-shaped handle having portions adjacent its ends bent angularly to form spaced parallel frame members, downwardly extending props at the outer ends of said frame members, a basket including a rigid bottom supported on said frame members, an axle extending transversely at the inner ends of said frame members and having wheels journaled at the ends thereof, and means for securing the bottom of the basket and said frame members to said axle.

PAUL BROWN.

REFERENCES CITED

The following references are of record in the file of this patent:

UNITED STATES PATENTS

| Number | Name | Date |
| --- | --- | --- |
| 1,042,193 | Bowling | Oct. 22, 1912 |
| 1,432,037 | Russell | Oct. 17, 1922 |
| 1,414,112 | Capen | Apr. 25, 1922 |
| 1,439,392 | Amon | Dec. 19, 1922 |
| 1,495,477 | Gammeter | May 27, 1924 |
| 1,500,108 | Clayton | July 8, 1924 |

FOREIGN PATENTS

| Number | Country | Date |
| --- | --- | --- |
| 696,969 | French | Oct. 21, 1930 |
| 134,812 | Swiss | Oct. 16, 1929 |